United States Patent
Hamilton

[19]

[11] Patent Number: 6,160,685
[45] Date of Patent: Dec. 12, 2000

[54] HARD DISK DRIVE WITH LIGHTLY CONTACTING HEAD

[75] Inventor: Harold J. Hamilton, San Jose, Calif.

[73] Assignee: Censtor Corp., Los Gatos, Calif.

[21] Appl. No.: 08/702,936

[22] Filed: Aug. 26, 1996

Related U.S. Application Data

[60] Division of application No. 07/966,095, Oct. 22, 1992, Pat. No. 5,550,691, which is a continuation-in-part of application No. 07/783,509, Oct. 28, 1991, abandoned, which is a continuation-in-part of application No. 07/632,958, Dec. 21, 1990, Pat. No. 5,073,242, which is a division of application No. 07/441,716, Nov. 27, 1989, Pat. No. 5,041,932.

[51] Int. Cl.[7] ................................................. G11B 5/48
[52] U.S. Cl. .............................................. 360/246.2
[58] Field of Search ................................. 360/102, 103, 360/104, 97.01, 119, 122, 237.1, 246.1, 246.2, 246.5

[56] References Cited

U.S. PATENT DOCUMENTS

| | | | |
|---|---|---|---|
| 4,620,251 | 10/1986 | Gitzendanner | 360/103 |
| 4,686,595 | 8/1987 | Bryer | 360/97.01 |
| 4,819,091 | 4/1989 | Brezoczky et al. | 360/97.01 |
| 4,901,185 | 2/1990 | Kubo et al. | 360/103 |
| 4,965,684 | 10/1990 | Stefansky | 360/97.01 |
| 4,991,045 | 2/1991 | Oberg | 360/104 |
| 4,996,623 | 2/1991 | Erpelding et al. | 360/104 |
| 5,065,271 | 11/1991 | Matsuura et al. | 360/104 |
| 5,065,500 | 11/1991 | Yoneda et al. | 360/103 |
| 5,072,320 | 12/1991 | Ezaki et al. | 360/97.01 |
| 5,166,845 | 11/1992 | Thompson et al. | 360/104 |
| 5,327,310 | 7/1994 | Bischoff et al. | 360/103 |

FOREIGN PATENT DOCUMENTS

| | | |
|---|---|---|
| 53-30310 | 3/1978 | Japan . |
| 53-30311 | 3/1978 | Japan . |
| 60-246015 | 12/1985 | Japan . |

OTHER PUBLICATIONS

IEEE Transactions of Magnetics, "A New Approach to making Thin Film Head–Slider Devices", Chapman, vol. 25, No. 5., Sep. 1989.

*Primary Examiner*—David L. Ometz
*Attorney, Agent, or Firm*—Mark Lauer

[57] ABSTRACT

An electromagnetic disk drive system including a rigid disk and electromagnetic read/write head structure and elongate flexure structure which cooperatively offer unique features and performance in the head/disk interface region. The head structure and flexure structure, in one form of the invention, are unitary and integrated and in another form are articulated. Both forms of the invention perform with substantially continuous dynamic contact with the recording surface of the disk, and both are characterized by a low effective mass and low contact force between the head and disk surface.

15 Claims, 3 Drawing Sheets

HARD DISK DRIVE WITH LIGHTLY CONTACTING HEAD

CROSS-REFERENCE TO RELATED APPLICATIONS

This application is a divisional of U.S. patent application Ser. No. 07/966,095, filed Oct. 22, 1992, now U.S. Pat. No. 5,550,691, which is a continuation-in-part of U.S. patent application Ser. No. 07/783,509, filed Oct. 28, 1991, now abandoned, which is a continuation-in-part of U.S. patent application Ser. No. 07/632,958, filed Dec. 21, 1990, now U.S. Pat. No. 5,073,242, which is a divisional of U.S. patent application Ser. No. 07/441,716, filed Nov. 27, 1989, now U.S. Pat. No. 5,041,932.

FIELD OF THE INVENTION

This invention relates generally to rigid-disk information-storage systems, and more particularly, to a unique structural organization therein which includes special focus on the localized read/write head/disk interface region, which region offers greatly enhanced performance regardless of system size (i.e., media form factor). Contact reading and writing and the use therefor of a low-mass, low-contact-force head/structure-flexure structure (both integrated as a single unit, and articulated for relatively independent movement) are key contributors at this interface region.

While a number of embodiments are known to be possible for implementation of the present invention, some of which are illustrated and described specifically herein, and while we recognize and advance the point that the features of the invention can be used in any size rigid-disk system (size independence), a preferred construction for the invention is disclosed herein in the setting of small-media-form-factor (48-millimeters), largely self-contained system which employs one or more rotary, rigid, magnetic recording disks.

BACKGROUND AND SUMMARY OF THE INVENTION

The advent of the digital computer created a demand for direct-access storage devices capable of storing and retrieving large volumes of data. Main memory (historically referred to as "core memory" but now typically formed as semiconductor memory) and other fast electronic storage systems were not feasible for mass-storage applications primarily because of their costs, while paper, tape and floppy disk memories proved ineffective due to their slow access times. Accordingly, digital storage devices using rotating, rigid magnetic media ("disk drives") were developed as an effective compromise between reasonable information access times and cost-effective storage capabilities. These disk drives also provided greater storage capacities for a given enclosure volume than most competing storage devices.

Disk drives typically contain one or more rotating rigid disks which have thin magnetic layers on their planar surfaces. Information is normally stored on and retrieved from the magnetic layers by means of a "flying head," which takes the form of an electromagnetic transducer element and an air-bearing slider. The slider positions the transducer on a pressurized air film at a relatively constant distance above the rotating disk surface. The pressurized air film is developed by loading a precisely shaped slider against a moving disk surface. A region of the air film moving with the disk surface is compressed by the slider, creating an air pressure that tends to force the slider away from the disk surface. By carefully controlling the shape and dimensions of the slider and the load force acting on the slider, the air being compressed between the slider and disk creates an upward pressure on the slider which maintains the slider in equilibrium at a reasonably stable distance away from the disk surface. Although this technique has traditionally been referred to as "flying-head" technology, the term "flying" is a misnomer, inasmuch as the head does not actually fly but instead is supported by a hydrodynamically lubricated air bearing.

In typical disk drives, a pair of heads is provided for use on opposite sides of each disk in order to increase the storage capacity per disk. These heads are typically mounted on support arms in a stacked configuration, with each support arm attached to a single high-speed actuator. The actuator is designed to move and position the heads accurately with respect to certain predetermined radial positions on a disk's surface, thereby permitting information to be recorded in discrete concentric tracks. Since the heads move in unison across the disk's surfaces, all of the heads on a common actuator are positioned to the same radius, and thus define a "cylinder" of tracks, which can permit any track in the current cylinder to be accessed within microseconds.

For low-performance disk drives, actuator positioning is performed "open loop", meaning that the actuator's position is determined by a device, such as a stepper motor, with no positional feedback from the disk. Open-loop methods limit areal density because they can only be used at relatively low track densities (which are measured in tracks per inch or "TPI"). In contrast, current high-performance disk drives utilize "closed loop" servo-positioning techniques to read and follow servo information stored on disks. This yields greater accuracy in positioning the actuator relative to the information recorded on a disk. Traditionally, in drives with three or more disks, the actuator's position is established with respect to a dedicated disk surface on which servo information is recorded, and all of the heads in the actuator stack are positioned in a cylinder relative to the position of the servo head on that dedicated disk surface. Alternatively, on drives with one or two disks, or on very high-performance drives, servo information is embedded within the data tracks, and head positioning is performed relative to the specific track of information being written or read.

Many computer operating systems now depend upon the availability of reasonably priced, high-performance mass-storage devices in order to implement practical solutions to such fundamental problems as the limited capacity of relatively expensive main memory. By swapping or paging portions of main memory selectively to and from a high-performance disk drive, the drive can be used, in effect, as an extension of main memory. This, in turn, permits the computer to operate on programs and data that exceed the size limitations of actual main memory. Graphical user interfaces and multimedia applications are creating even greater demand for improved disk drive performance and capacity.

Among the most important disk drive performance parameters are (1) formatted box storage capacity, (2) average access time to data, and (3) data transfer rate. Formatted box storage capacity, which measures storage capacity per unit of volume, has taken on increased importance because of the limited available space in desktop workstations, and because of the increased demand for portable, notebook, palmtop, and stylus-based microcomputer systems which are even more severely space-constrained. Access time is important because it plays a significant role in determining the typical time required to locate or store a particular unit of data on a disk drive. Finally, a high data transfer rate is important because a modem CPU can transfer data at a much faster rate than can a disk drive. This disparity creates a fundamental bottleneck in overall computer system performance that is a function of the data transfer rate. Accordingly, increases in CPU speed will not result in corresponding increases in overall system performance if the computer is input/output("i/o")-bound.

In an effort to overcome the disk drive i/o bottleneck and to improve disk drive performance, flying-head disk drive designs have continually been improved using the latest technology developments. Given the constraints of the available technology, a number of different design parameters may be altered to achieve an appropriate trade-off between improved performance, enhanced reliability, and reduced cost.

The major trend in the evolution of air-bearing, magnetic recording heads has been toward closer spacing between the slider and disk. This has been achieved by progressively making the disks flatter and smoother, by changing the shape and dimensions of the air-bearing interface, by miniaturizing the slider, and by making appropriate changes in the flexure which applies the load to the air bearing. A smaller head/disk spacing, or "flying height", increases head/disk efficiency and allows for increased areal recording density. Additionally, other disk drive performance parameters can be enhanced at lower flying heights, since the resulting improved linear and track densities permit a given quantity of data to be stored or retrieved with fewer disk rotations and with fewer, shorter head seeks.

Although lower flying heights can improve performance, they can also create a number of potential difficulties because of the fact that the resultant drives are more susceptible to problems caused by contaminants, by handling damage, by outgassing, and by other effects that produce small particles or surface irregularities. Imperfections that might not be significant at large flying heights can pose serious reliability problems at smaller head/disk spacings. Even with flatter disks having better surface finishes, the risk of high-velocity head contact with the moving disk surface, which can damage either or both components, is increased at reduced flying heights.

Notwithstanding head/disk contact during drive operation, reliable long-term drive operation can still be affected adversely by bead/disk interface problems because most sliders typically "land on" a disk when the spindle motor is turned off, and "take-off" from the disk when it is restarted. This take-off and landing of sliders on smooth disks can cause stiction-related problems, abrasive wear, and head crash. In designs utilizing slider load/unload mechanisms, contact-start-stop-induced stiction and wear problems can be reduced, but such mechanisms increase costs and create additional problems in guaranteeing reliable head loading.

While flying-head designs have achieved a high degree of reliability by avoiding head/disk contact during drive operation, all known flying-head disk drive designs share certain fundamental limitations. For example, air-bearing suspensions inevitably reduce head/disk magnetic efficiency due to spacing losses. Also, because of the requisite air-bearing structure, flying heads are normally large and massive in comparison with the size and mass of the actual recording transducer. Large head size and mass limit disk-to-disk spacing, and exacerbate the problems that arise when a head structure contacts a disk surface. A large slider mass also requires the use of far more powerful actuators, particularly in high-performance drives having multiple heads and disks, than would be required, for example, to move and position the transducer masses alone.

Considering further issues, the changes in the local surface velocity of a disk at different radii thereon creates additional problems for flying-head drives, since both flying height and air-bearing stiffness change in response to changes in air-film speed. In disk drives utilizing rotary actuators, head skewing causes changes in the air-pressure profiles along the air-bearing surface, which changes can cause similar difficulties. Finally, prior art flying-head, contact-start-stop drives are subject to stiction. They therefore require high-torque motors to ensure that disk rotation can be initiated despite stiction and friction arising from head/disk contact prior to head take-off. The resultant increase in power consumption can be especially detrimental in portable, notebook, palmtop, and stylus-based computer disk drive applications due to the power limitations imposed by the use of batteries in these products. Higher power consumption also increases heat generation, which can adversely affect the reliability of the drive system.

Significant advances over prior art flying-head technology have been disclosed in the following U.S. Patent and co-pending U.S. Patent Applications: U.S. Pat. No. 5,041,932 for INTEGRATED MAGNETIC READ/WRITE HEAD/FLEXURE/CONDUCTOR STRUCTURE, issued Aug. 20, 1991; U.S. patent application Ser. No. 07/632,958 for METHOD OF MAKING INTEGRATED MAGNETIC READ/WRITE HEAD/FLEXURE/CONDUCTOR STRUCTURE, filed Dec. 21, 1990; U.S. patent application Ser. No. 07/710,561 for INTEGRATED MAGNETIC READ/WRITE HEAD/FLEXURE/CONDUCTOR STRUCTURE, filed Jun. 5, 1991; U.S. patent application Ser. No. 07/710,891 for INTEGRATED MAGNETIC READ/WRITE HEAD/FLEXURE/CONDUCTOR STRUCTURE, filed Jun. 11, 1991; U.S. patent application Ser. No. 07/684,025 for WEAR-RESISTANT HEAD FOR CONTACT READING AND WRITING MAGNETIC MEDIA, filed Apr. 10, 1991; U.S. patent application Ser. No. 07/746,916 for UNITARY MICRO-FLEXURE STRUCTURE AND METHOD OF MAKING SAME, filed Aug. 19, 1991; and U.S. patent application Ser. No. 07/760,586 for HIGH-CAPACITY, MICRO-SIZE, RIGID-DISK, MAGNETIC DIGITAL-INFORMATION STORAGE SYSTEM, filed Sep. 16, 1991; and U.S. patent application Ser. No. 07/783,619 for GIMBALED MICRO-HEAD/FLEXURE/CONDUCTOR ASSEMBLY AND SYSTEM, filed Oct. 28, 1991. The respective disclosures of these documents are hereby incorporated by reference into the present disclosure.

Taken together, and more particularly, with various ones of their respective innovative features "gathered" into one selected operative whole, the inventions illustrated and described in the just-cited materials reveal extremely low-mass, integrated (and gimbaled) head/flexure/conductor structures wherein the head and flexure combination yields an extremely small, low-mass unit, and wherein further, the conventional "flying" slider has been replaced by a contact-capable structure featuring a hardened wear pad with greatly miniaturized dimensions. This wear pad is disposed immediately adjacent a head/transducer, with which it is formed on a minute ceramic structure which, in the integrated form referred to above, forms an end portion of an elongate flexible ceramic cantilevered beam, and which, in the gimbaled form referred to above, is joined to the free end of such a beam for articulation relative thereto through gimbal structure. In both the integrated and the gimbaled organizations, the beam effectively supports and loads the pad against, and for substantially continuous, microscopic-area contact with, a moving recording-surface medium, thus to place the pole portion of the transducer in extremely close proximity to the recording surface. Formed in the ceramic structure, as will be explained below, are the other magnetic components that make up the balance of the magnetic portion of the transducer, as well as associated conductive windings, and conductive traces which extend from the free, distal, working end of the head/flexure/conductor structure toward the opposite end for suitable signal-communication connection with the appropriate world "outside of" the beam/flexure/head/transducer organization.

Included in several of the drawing figures herein, and discussed and described below, are several greatly enlarged views illustrating some of the key features of two embodiments of head/flexure/conductor structures which have been selected for illustration in the preferred form(s) of the invention herein disclosed. Further details of these structures, of related others, and of the process(es) for manufacturing the same, are found in the elaborated disclosures in the patent and patent applications referred to above and incorporated herein as an integral part of the disclosure in this specification.

The significant reductions in head/flexure/conductor size, effective mass, and required load which are offered by the highly miniaturized, integrated and gimbaled structures now being referred to readily permit the media-contacting wear pad (referred to above) to be operated confidently in sliding contact with a recording surface in a rigid disk, essentially for the lifetime of the associated disk drive system, without any appreciable risk of physical damage to either component. Contact "magnetic coupling" of these two elements strikingly reduces the kinds of "spacing" losses that characterize prior art "flying" disk drive system technology, and greatly improves the electromagnetic signal-transmission efficiency of the resulting head/media interface system with startling improvements in information-storage areal density. It is the combination of this low-mass, miniature-size, sliding-contact organization within the overall system that offers the novel head/disk interface advantage referred to above, and that forms a core contribution in the system of the present invention.

From the statements given just above regarding various conditions found in prior art "flying-technology" disk drive systems, and from the significant improvement opportunities that are offered by features of the inventions described and illustrated in the above-referenced issued patent and co-pending patent applications, one can state that an important general object of the present invention is to provide a reliable, high-performance, rigid disk drive system for storing and reproducing digital information, which system is characterized by highly efficient data transfer, by a large storage capacity per unit of volume, and by a greatly improved read/write head/disk interface region which contributes significantly to such "capacity/efficiency" advances.

Another and related object of the invention is to provide such a system in which high performance and large capacity per unit of volume advances are achieved through employing contact reading and writing, utilizing a greatly miniaturized electromagnetic read/write head structure and elongated flexure structure which collectively have an effective mass of less than about 1.5-milligrams. Both integrated and gimbaled constructions of this organization are shown and achieve this objective.

Further objects of the present invention include the provision of: a storage system wherein position control of the head structure and flexure structure is provided by a precision, low-mass servo/actuator; a storage system which has reduced power requirements; such a system which will not experience a head crash; a system which operates with significantly lighter applied head loads; a system of the type outlined which is substantially free from the effects of stiction; a system offering all of the above in conjunction with notably fast seek times; and a system which, because of the features that characterize what has been referred to herein as the improved read/write head/disk interface region, offers a greatly enhanced storage capacity per unit of volume than is offered by known prior art systems, regardless of the particular, selected media form factor.

These and other important features, objects and advantages which are attained by the present invention will become more fully apparent as the description that now follows is read in conjunction with the accompanying drawings.

DETAILED DESCRIPTION OF, AND BEST MODE FOR CARRYING OUT, THE INVENTION

Figure 1:
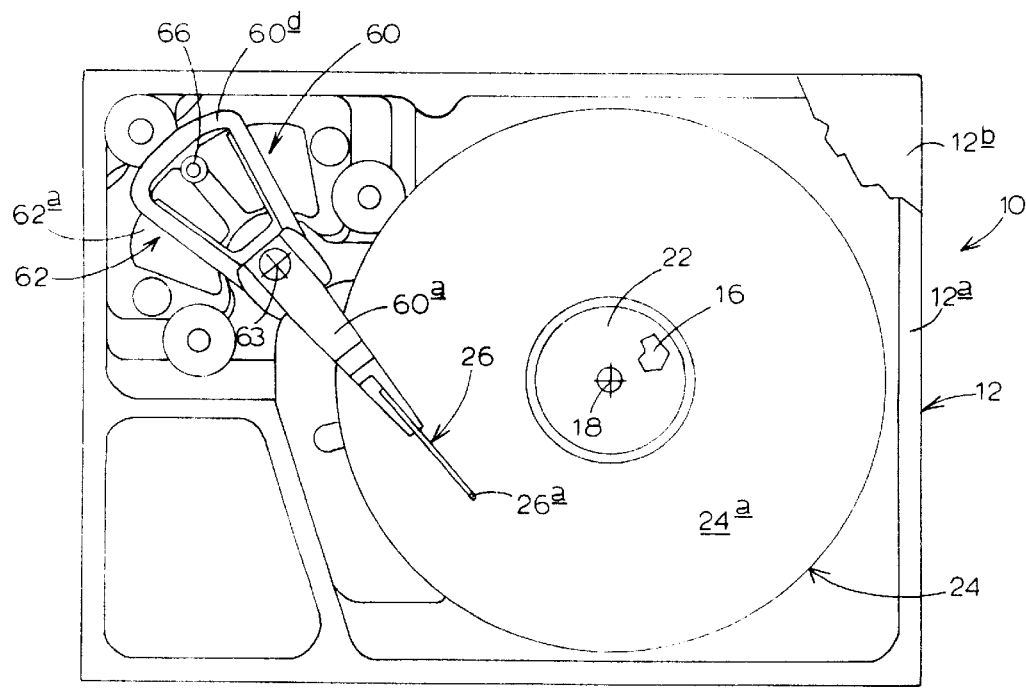
FIG. 1 is an opened-up plan view illustrating a small-format, rigid-magnetic-disk, digital-information storage system incorporating localized read/write enhancements which are constructed in accordance with the present invention.
Figure 2:
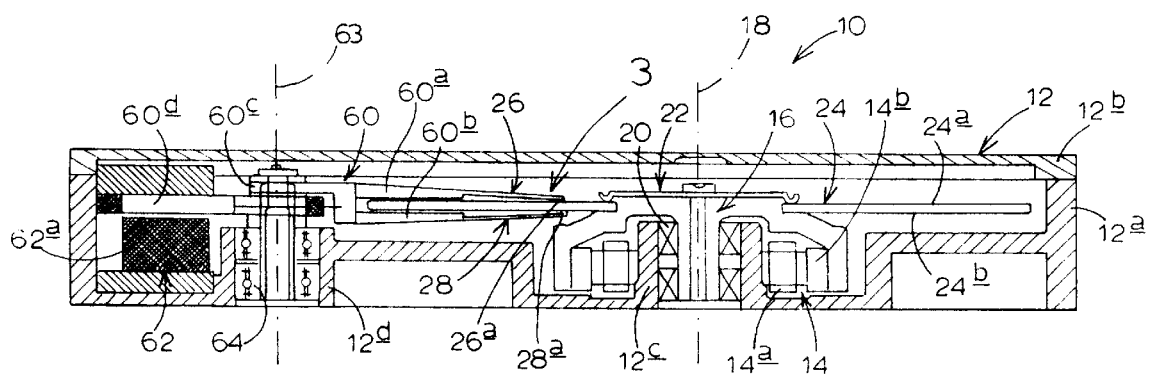
FIG. 2 is a view on a slightly larger scale than that used in FIG. 1 which depicts, in longitudinal section, the system shown in FIG. 1, with this view taken as if looking upwardly from the bottom of FIG. 1.

Turning attention now to the drawings, and referring first of all to FIGS. 1 and 2, indicated generally at 10 is an information storage system in the form of a rigid disk drive system for storing digital information. Structure employed in this system embodies one form of the read/write head/disk interface region which lies at the heart of the present invention.

Included in system 10 is a two-part housing 12, including a base 12*a*, and, sealingly joined thereto (as via a concealed gasket made, for example, of silicone rubber), a cover 12*b*. Housing 12 encloses all of the other components which, together with the housing, make up system 10. In the preferred embodiment now being described, the inside of the sealed housing is maintained essentially at equilibrium with atmospheric pressure. However, there may be instances, where it is desirable to enhance certain performance behavior, to evacuate the housing and, to this end, a suitable evacuation pressure is about 0.05-atmosphere.

Disposed within housing 12 is a low-power, brushless, D.C. spindle motor, or motor means, 14 which includes a coil-carrying stator 14*a* mounted suitably on the outside of a hollow, cylindrical supporting boss 12*c* formed in housing base 12*a*. Motor 14 also includes a permanent-magnet rotor 14*b* which is suitably joined, with the disposition shown, to a lightweight rotary spindle 16. Spindle 16 is mounted, through a journal bearing 20 which is seated within the hollow interior of boss 12*c*, for rotation about an axis shown at 18.

During drive operation, through appropriate connections (not shown) with conventional control/feedback electronics, motor 14 during operation operates to maintain an accurate, constant spindle rotational speed of about 4800-rpm.

Supported on the upper side of spindle 16 (for rotation as a unit therewith) through a suitable clamp 22, or other kind of attachment means, is a rigid magnetic recording disk 24 which is prepared on its opposite axial sides with magnetic layer structure for two-sided reading and writing of digitized information. These two sides of disk 24 are shown at 24*a*, 24*b*, and the magnetic recording layer structure just referred to, on each of the disk's sides, is referred to as a magnetic recording surface structure. Information is recorded on this surface structure in concentric, adjacent recording tracks.

Further discussing disk 24, each recording surface takes the form of an underlying soft magnetic flux-return layer with an in-plane, preferably radially oriented, magnetic anisotropy, and an outer, or overlying, hard magnetic recording film with an out-of-plane magnetic anisotropy. The recording film is protected by a smooth carbon overcoat, and an optional lubricant layer to minimize head and disk wear.

Because of the fact, which will become apparent, that the loads applied to disk 24 herein are far reduced in comparison with loads applied to disks in prior art flying-head drives, the central supporting substrate of the disk can optionally be made thinner than those substrates which are employed in prior art disks. For example, in the system now being described, the transducers (still to be described) which are used contact the disk's recording surfaces, do so with a load of only about 40- to about 120-milligrams. Such a load is about two orders of magnitude lower than comparable load forces that characterize transducer/disk loading in prior art flying-head designs.

Among the end results of all of this are not only that head/disk wear is greatly minimized, but so also are overall system size and system operating-power requirements.

Cooperating with disk 24 in system 10 in the embodiment now being described, for reading and writing digital information with respect to recording surfaces 24*a*, 24*b*, are two read/write head structure and elongate/flexure structure units 26, 28, respectively, which are constructed in accordance with features that are described in detail in the above-referred-to patent and co-pending patent applications. Each of units 26, 28 is integrated in construction, and includes a read/write head structure, or transducer, carried adjacent the distal end of the structure, which end has a contact-pad-embedded pole tip that is substantially continuously in sliding contact with the respective associated recording surface in disk 24. The distal ends of units 26, 28 are shown at 26*a*, 28*a*, respectively. The ways in which units 26, 28 are cantilever-mounted for movement relative to the disk's recording surfaces will be explained shortly, but we will mention here that each of these elongate units is mounted with the cantilevered end at an angle of about 3-degrees with respect to the associated surface of disk 24, and with the distal (transducer) end of the unit contacting its associated disk surface through a hardened wear pad with a force of about 40-milligrams.

Figure 3:
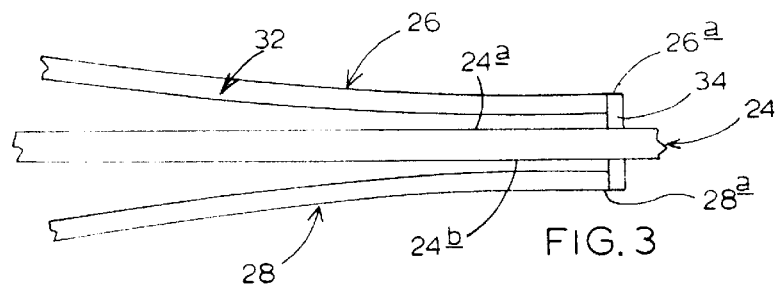
FIG. 3 is a much enlarged, not-to-scale, fragmentary, simplified side elevation of a pair of isolated (removed from the system), integrated, read/write/head/flexure/conductor structures illustrated in operative sliding contact with the recording surfaces in a rigid recording disk, with focus in this figure being localized to the read/write head/disk interface region which forms the basis of the present invention—such region being pointed to by an arrow 3 in FIG. 2.
Figure 4:
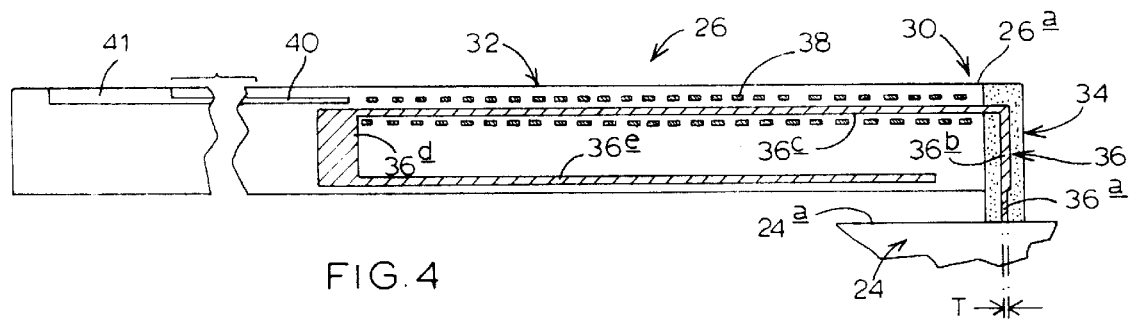
FIG. 4 is an even more greatly enlarged, fragmentary, longitudinal, lateral cross section of one of the structures of FIG. 3, illustrating a probe-type head wherein a head structure and a flexure structure are unitary and integrated to operate and move as a single unit, with the head in the head structure being of the probe type.

Digressing for a moment from the system description now under way, and addressing attention briefly to FIGS. 3 and 4, here there is shown the construction of unit 26—the construction of unit 28 being substantially exactly the same. Unitary unit 26 includes a read/write head (transducer) structure 30 near end 26*a*, an elongate beam-like flexure structure 32, and a hardened wear pad 34 which at least partially encompasses what might be thought of as the working end portion of the transducer structure.

Taking a little more detailed look at what is shown in FIG. 4, included in head structure 30 is magnetic pole structure 36 which includes a read/write pole tip 36*a* located at the lower end of a yoke 36*b* which joins with an elongate magnetic core 36*c*. Further describing the magnetic structure, the same includes a back-gap stud 36*d* and a return yoke 36*e*. A helix coil 38 surrounds core 36*c*, and joins with elongate electrical traces, or conductors, such as conductor 40, which extend toward suitable contact pads, such as pad 41, formed adjacent the left end of flexure structure 32 as seen in FIG. 4.

While different specific dimensions may be employed in unit 26, the same herein has an unsupported length of about 8.0-mm, an overall width (its dimension into the planes of FIGS. 3 and 4) of about 0.5-mm, and an overall thickness (its vertical dimension in FIG. 4) of about 0.04-mm. The width of read/write pole tip 36*a* is about 6-microns, and the thickness T at the pole tip (see FIG. 4) is about 0.25-microns. The effective mass of the entirety of the portions making up unit 26 herein is no more, and preferably less, than approximately 1.5-milligrams.

Returning to a description of other components included in system 10, indicated generally at 60 in FIGS. 1 and 2 is a servo-controlled actuator assembly, or actuator means, which operates in conjunction with a voice coil motor 62 to support and move the two head/flexure/conductor units (26, 28) in arcs over the opposing recording surfaces in disk 24, thus to position the transducers therein with respect to any selected, concentric read/write track on the disk's surfaces.

The actuator is a relatively lightweight assembly (about 1.5-grams) which pivots on an axis shown at 63, with this assembly including upper and lower, radially extending arms 60*a*, 60*b* which carry, in a radially extending fashion, previously mentioned head/flexure/conductor units 26, 28, respectively. These arms are borne on a central rotary hub 60*c* which is journaled on the inside of a hollow, cylindrical boss 12*d* formed in housing base 12*a*. A suitable journal connection is established through a journal bearing 64 which is like previously mentioned bearing 20.

Actuator 60 is a mass-balanced rotary design, with the cantilevered masses of arms 60*a*, 60*b*, and of units 26, 28, counterbalanced by a counterbalance-formation 60*d* which, in the embodiment now being described, takes the form of a coil winding that actually forms the "rotor" in previously mentioned voice coil motor 62. A position limiter pin 66 (see particularly FIG. 1) limits the swing of the transducers in units 26, 28 to an arc of about 30-degrees, which allows these transducers to sweep into operative positions over the full recordable expanse of recording surfaces 24*a*, 24*b*. More specifically, pin 66 permits the transducers to swing inwardly to a distance of about 9-mm from axis 18 and outwardly to a distance of about 23-mm from the same axis. Those skilled in the art will thus recognize that the system of the present invention is capable of reading and writing data radially inwardly on a disk (regardless of media form factor) which is closer to the spin axis than the innermost radial locations typically usable by conventional flying-head systems.

Forming the stator in motor 62, which stator cooperates with rotor 60*d*, are permanent magnets, such as magnet 62*a*, which are suitably joined to base 12*a* beneath the rotor.

The rotary actuator and associated mechanism selected for system 10 herein can be viewed as taking the form essentially of a pivoted beam with read/write head structures located adjacent one end, and with a voice coil motor positioned adjacent the opposite end. When energized during system operation, actuator 60 moves the head structures in arcuate paths approximating radial paths over the recording surfaces in disk 24. In conventional flying-head drives, such arcuate motion with a rotary actuator creates head-skewing effects which cause significant variations in air-bearing stiffness, and consequent changes in head/media spacing. However, because the system of the present invention does not rely upon air-bearing effects in order to maintain a uniform head/disk interface, head skew is largely irrelevant, and actuator 60 can be used successfully to transport the transducers radially inwardly to positions very close to spin axis 18.

In system 10, motion in actuator 60 is controlled using conventional closed-loop servo techniques, with appropriate servo-positioning data embedded on tracks in disk 24 to form a feedback loop that ensures accurate transducer positioning.

Conventional high-transfer-rate data-channel structure (not shown) is employed to provide an electrical interconnection between the head/flexure/conductor structures and conventional interface electronics which connect system 10 to external devices.

In system 10, as just described, storage capacity on each of sides 24*a*, 24*b* exceeds 40-megabytes. Strongly contributing to this large-capacity storage capability and to high reliability in utilizing the same, is the unique head/disk interface region which exists as a consequence of the novel features of the present invention. More particularly, the tiny mass which is associated with each of units 26, 28 allows for substantially continuous sliding-contact operation with the surfaces in disk 24, under an extremely small, applied static load of about 40-milligrams or less. These features at the interface region, coupled with the very small dimensions (mentioned above) which characterize the pole tip in the transducer carried in each of units 26, 28, offer the remarkable and reliable storage-capacity performance which has just been described.

Bearing in mind that the system now being described embodying the present invention is one in which a rigid disk with extremely small form factor is being used, one can recognize that implementation of the invention in larger form-factor disk drive systems offers equally startling improvements in reliable information storage capacity, and that utilization of the invention is independent of the size of system in which it is incorporated.

Figure 5:
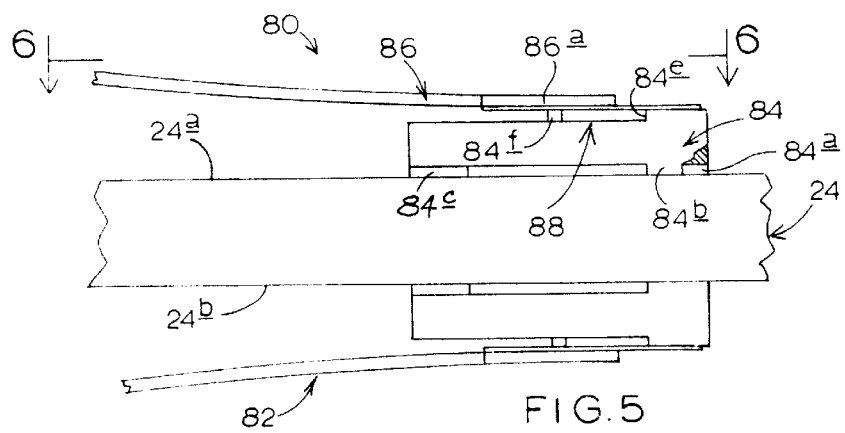
FIG. 5 is a view which is similar to FIG. 3, with the important exception that FIG. 5 illustrates a modified form of the invention in which electromagnetic read/write head structures and elongate flexure structures are joined through gimbal mechanisms which permit limited relative movement between these two structures. (Other gimbaled assemblies usable are illustrated and described in the "GIMBALED MICRO-HEAD/FLEXURE/CONDUCTOR ASSEMBLY AND SYSTEM" U.S. patent application referred to above, filed Oct. 28, 1991)
Figure 6:
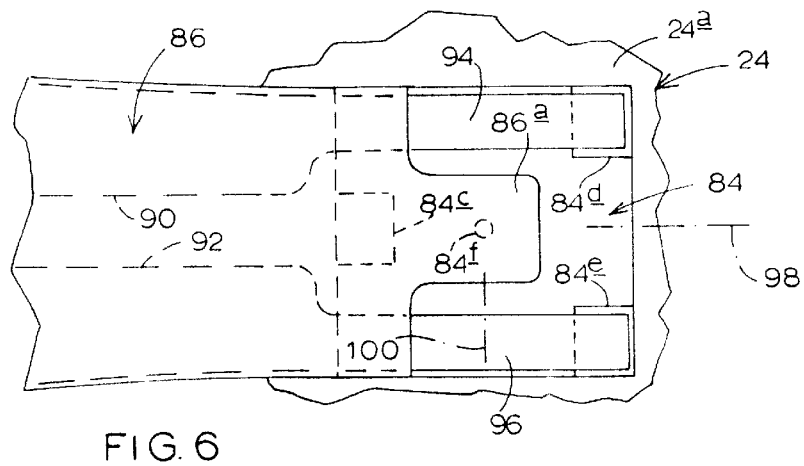
FIG. 6 is a fragmentary view on substantially the same scale as that employed in FIG. 5, taken generally along line 6—6 in FIG. 5.
Figure 7:
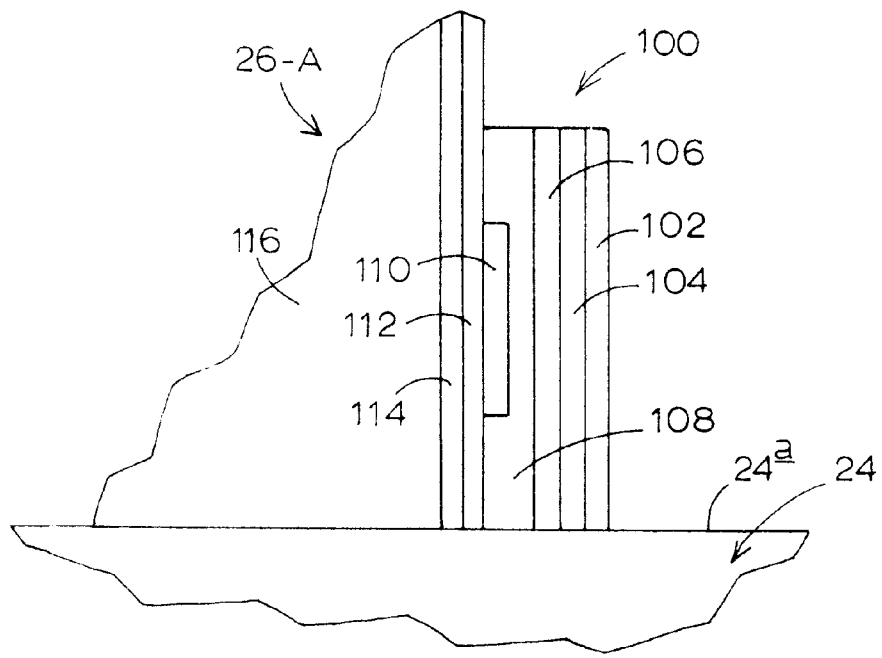
FIGS. 7 and 8 both show greatly enlarged, fragmentary cross sections of the head in contact with the recording surface of the disk.
Figure 8:
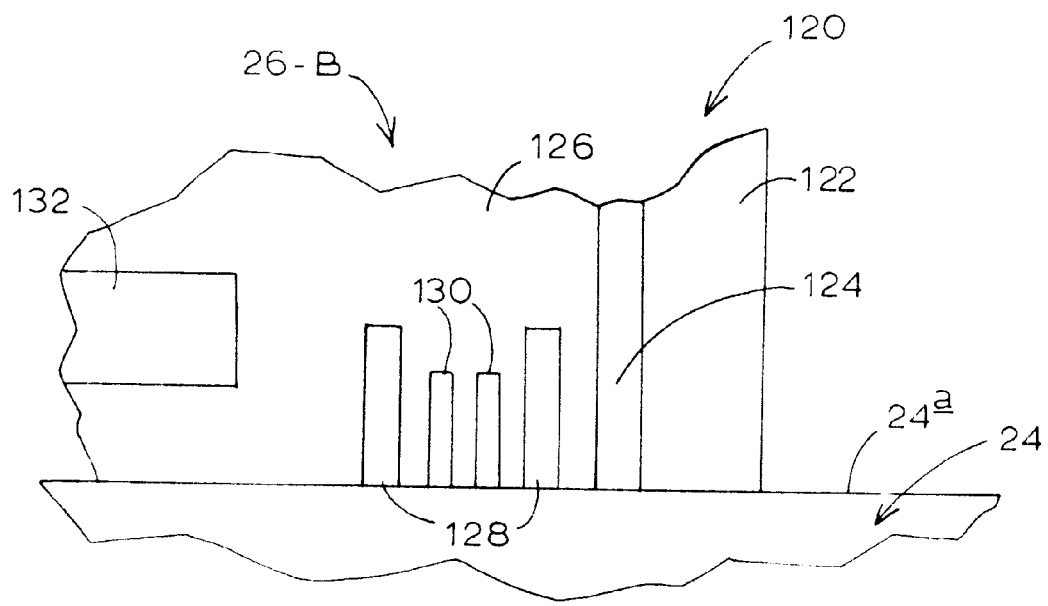

Turning attention now to FIGS. 5 and 6 in the drawings, (wherein elements are not shown in exact relative proportions) here there are illustrated in system 10 a modified form of read/write head structure and elongate flexure structure in which articulation, or gimbaling, interconnects the two for limited relative motion. Two articulated assemblages, working on sides 24*a*, 24*b* of disk 24 as shown, are indicated at 80, 82, respectively, each of these being substantially the same in construction.

Accordingly, and considering the construction of assembly 80, the same includes a head structure 84, and an elongate flexure structure 86, the distal end 86*a* in which is joined to the head structure through gimbal mechanism 88 which permits limited relative articulation between the head structure and the flexure structure.

Details of the construction of assemblies 80, 82, as well as of several other similar assemblies, are found in above-referred-to patent application filed Oct. 28, 1991 for an invention entitled GIMBALED MICRO-HEAD/FLEXURE/CONDUCTOR ASSEMBLY AND SYSTEM, Ser. No. 07/783,619, and these details are, accordingly, omitted from exposition in the present specification. However, and still with reference specifically to assembly 80, looking at the same in general terms, the head structure includes a solid body formed of a suitable dielectric material, such as aluminum oxide, which body is shaped with three projecting feet, seen herein at 84*a*, 84*b*, 84*c* constructed of a hardened wear material, such as diamond-like carbon, with one of these feet (herein, foot 84*c*) having embedded within it the read/write pole tip of a probe-type transducer very much like that which is illustrated in the structure pictured in FIG. 4. On the upper side of head structure 84 are two upwardly projecting conductive posts 84*d*, 84*e* which join conductively with embedded (contained within head structure 84, and not illustrated) coil structure which cooperates operatively with the magnetic components of the transducer in head structure 84. The head structure body is also formed, on its upper side in FIGS. 5 and 6, with a central projecting pin 84*f*.

Embedded within the dielectric body of flexure structure 86 are two elongate conductors 90, 92 which correspond to the conductors, like conductor 40, mentioned earlier with respect to structure 26 in FIG. 4.

Joining with the right ends of conductors 90, 92 in FIG. 6 in accordance with the teachings of the just immediately above-referred-to, prior-filed patent application are two elongate conductive ribbons 94, 96 respectively, with the right ends of these ribbons conductively and mechanically bonded to the upper sides in FIGS. 5 and 6 of previously mentioned conductive posts 84*d*, 84*e*, respectively. Ribbons 94, 96 form, in part, previously-mentioned gimbal mechanism 88. In addition, they complete an electrical circuit for the coil structure present in head structure 84 to the conductors in the flexure structure, which in turn provide electrical communication to the "outside world".

Completing a description of what is shown in FIGS. 5 and 6, the distal end 86*a* in flexure structure 86, as viewed in FIG. 6, takes the form of a central projecting blade-like tongue which, in assembly 80, overrides, and, in a fulcrum-like way, rockingly contacts the outer, upper end of pin 84*f*.

The articulated organization which has just been described is one in which head structure 84 is permitted a limited amount of rocking (relative to flexure structure 86) about the orthogonal axes shown at 98 (roll axis), 100 (pitch axis) (see FIG. 6). This rocking occurs with pivotal contact existing between pin 84 and the underside of flexure structure end 86a. No rocking is permitted, however, between head structure 84 and flexure structure 86 in what might be thought of as the planes of these structures—namely about an axis normal to the plane of FIG. 6.

As is pointed out in the relevant prior-filed patent application which more fully discloses the construction of assemblies 80, 82, these assemblies are useful in situations where it is desirable to take special notice of any unevenness which might exist in the recording surface of a rigid disk or which might result from the manner that the disk is mounted in the storage system. Assemblies 80, 82 are also useful in situations where it is desirable to allow more mounting tolerance of the head structure and flexure structure relative to the position of the disk.

Each of assemblies 80, 82 is characterized by an effective mass of no more than about 1.5-milligrams, and each operates with its respective associated head structure substantially continuously in contact with the associated recording surface in disk 24. Thus, in these two important respects, i.e., contact operation and low-mass construction, assemblies 80, 82 offer the same important advantages provided by units 26, 28. The gimbaled construction of these assemblies allows the head structures to stay in contact with rotating disks that may exhibit waviness or unevenness of the contacted recorded surface. Such construction also accommodates larger head and disk mounting tolerances in a drive system such as system 10.

Thus, two significant embodiments of the system of the invention have been shown and described herein, and other embodiments have been incorporated by reference. And, it should be apparent to those skilled in the art that each system embodiment set forth offers all of the advantages and meets all of the objectives set forth hereinabove. By way of highlighting this statement, it should be apparent that each of the two system embodiments features a reliable, high-performance, rigid disk electromagnetic recording system for storing and reproducing digital information, where the system is characterized by highly efficient data transfer functioning, by a large potential storage capacity per unit of volume, and by greatly improved dynamic performance—all promoted and enhanced by the greatly improved read/write head/disk interface region proposed by this invention which contributes significantly to such "capacity/efficiency" advances in the art.

It should further be apparent that, while two specific embodiments of the invention have been illustrated and described herein, variations and modifications may be made to suit particular operating circumstances, all of which variations and modifications will come properly within the scope and spirit of the invention.

What is claimed is:

1. A hard disk drive system comprising a rapidly spinning rigid disk having a media layer and an associated major surface, and a beam extending lengthwise along a longitudinal axis between a mounting end and a free end with a head disposed adjacent to said free end, said head including a transducer extending into a pad contacting said major surface and aligned with said axis, said pad having a width measured in a direction substantially perpendicular to said longitudinal axis that is less than one-half millimeter, with a minimal force maintaining sliding contact between said pad and said major surface amid communication between said transducer and said media layer, wherein a portion of said major surface adjacent to said head travels substantially along said lengthwise direction.

2. The system of claim 1 wherein a portion of said transducer is in dynamic contact with said major surface.

3. The system of claim 1 wherein said head has a plurality of projections directed toward said disk.

4. The system of claim 1 wherein said beam includes a plurality of adjoining layers, at least one of said layers being a conductive lead, said lead being electrically connected to said transducer.

5. The system of claim 1 wherein said force is less than about 120 milligrams.

6. The system of claim 1 wherein said force is at least about 40 milligrams.

7. The system of claim 1 wherein said force is between about 40 milligrams and about 120 milligrams.

8. The system of claim 1 wherein said force is about 40 milligrams.

9. A hard disk drive system comprising a rapidly spinning rigid disk having a media layer adjacent to a major surface, a spring-like beam extending along a longitudinal axis adjacent to said major surface, said beam containing a plurality of conductive leads, each of said leads having a substantially rectangular cross-section, and a head including an electromagnetic transducer held at an end of said beam and connected to said leads, said head having a disk-contacting projection aligned with said axis and including a portion of said transducer, said projection having an area facing said major surface that is less than one square-millimeter and being held to said major surface with a minimal force sufficient to maintain sliding contact between said head and said major surface amid communication between said head and said media layer.

10. The system of claim 9 wherein a portion of said major surface adjacent to said head travels a similar direction as said beam extends.

11. The system of claim 9 wherein said head has a plurality of projections directed toward said disk, including said disk-contacting projection.

12. The system of claim 9 wherein said force is less than about 120 milligrams.

13. The system of claim 9 wherein said force is at least about 40 milligrams.

14. The system of claim 9 wherein said force is between about 40 milligrams and about 120 milligrams.

15. The system of claim 9 wherein said force is about 40 milligrams.

* * * * *